United States Patent [19]
Brown et al.

[11] Patent Number: 4,736,321
[45] Date of Patent: Apr. 5, 1988

[54] COMMUNICATION METHOD BETWEEN AN INTERACTIVE LANGUAGE PROCESSOR WORKSPACE AND EXTERNAL PROCESSES

[75] Inventors: James A. Brown, San Jose, Calif.; John A. Gerth, Danbury, Conn.; Michael T. Wheatley, San Jose, Calif.

[73] Assignee: International Business Machines Corporation, Armonk, N.Y.

[21] Appl. No.: 859,592

[22] Filed: May 5, 1986

[51] Int. Cl.$^4$ ............................................... G06F 1/00
[52] U.S. Cl. ................................................. 364/300
[58] Field of Search ... 364/200 MS File, 900 MS File, 364/300

[56] References Cited
U.S. PATENT DOCUMENTS 4,394,725  7/1983  Bienvenu et al. ............... 364/200
4,680,698  7/1987  Edwards et al. ............... 364/200

Primary Examiner—Raulfe B. Zache
Attorney, Agent, or Firm—R. Bruce Brodie

[57] ABSTRACT

A method for executing external processes and for accessing external data from within an interactive language workspace. The workspace task referencing the external processes or data is synchronized and locked until the process is completed or the data referenced. The method steps provide establishing a message interface and utilize coercion of arguments in a dynamic environment. This permits, for instance, the invocation of a FORTRAN language process or from within an APL workspace and a return of information from said external processor without terminating the APL workspace.

5 Claims, 6 Drawing Sheets

Processor 11
Overview

Processor 11
Overview

Processor 11
Names File

:nick.FUNCTION
    :load.LIBRARY
    :memb.PROGRAM
    :link.FORTRAN
    :rarg.< E8 1 5

FIG. 2

Processor 11

Argument Patterns

FORTRAN:

```
SUBROUTINE CALC(A,B,C)
REAL*4 A(10,10)
INTEGER*2 B
CHARACTER*4 C
```

APL:

```
A←10 10ρ10.5 2 17
B←27
C←'TEXT'
3 11 ⎕NA 'CALC'

CALC (A B C)
```

NAMES FILE:

:RARG.(G0 1 3)(E4 2 10 10)(I2 0)(C1 1 4)

FIG. 3

Processor 11

Argument Patterns

[×/ρ] [<|>] RT RL ρρ [ρ]

RT/RL:

- B1 – Boolean
- B4 – Hexadecimal
- B8 – Integer Byte
- I2 – Halfword Integer
- I4 – Fullword Integer
- E4 – Short Real
- E8 – Long Real
- E16– Extended Real

- J16– Long Complex
- C1 – 1-byte Character
- C4 – 4-byte Character
- Pn – Packed Decimal
- Zn – Zoned Decimal
- A8 – Integer Progression

- G0 – General Array

FIG. 4

Processor 11
Argument Patterns

- Simple matrix:
    :rarg. I4 2 2 3

- Vector of any length:
    :rarg. C1 1 *

- Single real number:
    :rarg. 1 E8 *

- Nested array: (2 3ρ6 6) 'ABCD'
    :rarg. (G0 1 2) (I2 2 2 3) (C1 1 4)

FIG. 5

Processor 11
Results + Updated Arguments

Call by value:

```
        ∇R←TIMES2 A
   [1]  R←2×A
        ∇
        TIMES2 5
   10
```

Call by name:

```
        ∇TIMES2 N
   [1]  ⍎N,'←2×',N
        ∇
        A←5
        TIMES2 'A'
        A
   10
```

```
SUBROUTINE  TIMES2(A)
REAL*8 A
A = A * 2
END
```

FIG. 6

COMMUNICATION METHOD BETWEEN AN INTERACTIVE LANGUAGE PROCESSOR WORKSPACE AND EXTERNAL PROCESSES

TECHNICAL FIELD

This invention relates to a method for executing external processes and for accessing external data from within an interactive language workspace.

BACKGROUND

APL is among the best known interactive language systems. It also serves as a system of mathematical-like denotation. APL typically executes on a system including a keyboard, raster display, and an intercoupling CPU. It has been expressly designed to be interactive. This includes the facility to construct, modify, and execute software dynamically. This further includes the direct processing of entire data structures. APL's power derives from the use of a general data structure, the array, with the consequential ability to define powerful operators on the structure. Descriptions of the language system and its facility may be found in Gilman and Rose, "APL: An Interactive Approach", 3rd Edition, John Wiley Publishing Co., copyright 1984; Polivka and Pakin, "APL: The Language and Its Usage", Prentice Hall Publishing Co., copyright 1975; Rodney Zaks, "A Microprogrammed APL Implementation", Sybex, Inc., copyright 1978; and "APL2 Programming: Language Reference", IBM publication SH20-9227-1.

The interactive operating environment of APL permits control to be passed back and forth between an executing program and an operator as necessary. External storage, including software and data, are grouped into workspaces. These may be saved from session to session. System commands are provided to allow workspaces to be brought into central memory from external storage and stored back again after being updated.

APL is implemented traditionally on a interpreted program execution basis. Interaction between an APL session and systems external thereto, such as device drivers and the like, has been by way of a defined message interface and processes auxiliary to and asynchronously executing with respect to the APL workspace/session. The message interface and synchronization mechanism, termed "shared variables", is described by Polivka at pages 439–491.

For purposes of completeness, it should be appreciated that interfaces by which asynchronous processes may synchronously exchange messages may also be performed using such constructs as semaphores, in addition to shared variables. As pointed out by Filman and Friedman, "Coordinated Computing", McGraw Hill Computer Science Series, copyright 1984, pp. 28–43 and 57–73, the shared-variable model has two kinds of objects. These are namely processes and shared variables. The processes compute independently and asynchronously. They communicate only by reading and writing the shared variables. A process that reads a shared variable obtains its value, while a process that writes a shared variable changes its value. Significantly, at any instant, a shared variable has only one value and that value is the one last assigned to it by one of its accessing processes.

THE INVENTION

It is an object of this invention to devise a method for executing external processes and for accessing external data from within an interactive language workspace. It is a related object that the method be operable where the workspace task referencing the external processes or data is synchronized and locked until the process is completed or data referenced.

The aforementioned objects are satisfied by the method steps which provide establishing a message interface and utilize bidirectional coercion of arguments in a dynamic environment. This permits, for example, the invocation of a compiled FORTRAN process from within an APL workspace and a return of information from said external processor without terminating the APL workspace. The method steps involve invocation of a computation by an external process and bidirectional conversion of argument and result data into forms acceptable to both APL and external processes. This involves the steps of (a) establishing a message interface between the source and external processes, including designating and locally recording argument data types expected by the external process; (b) converting arguments to the data types expected by the external process and calls by value from the source process into calls by pointer type, and passing the converted calls via the interface to the external process; and (c) responsive to the completion of external processing, converting operands into data types acceptable to APL.

If an APL application desires to invoke a FORTRAN library routine where the routine is resident in a library external to the APL workspace, the aforementioned steps would operate in the following manner. First, the "name" of the FORTRAN routine must be declared within the APL environment and to a processor associated with the APL language system. The contents of the declaration operate to (1) index a predetermined concordance of the "name" of the FORTRAN process and associated "data types" of the FORTRAN routine arguments and results, and (2) pass the data type information to the APL environment. Second, when an APL application calls the FORTRAN routine, an operand/expected operand type comparison is made between the arguments to be remitted to the external routine and the results to be obtained therefrom. The arguments are converted to the expected data types and are sent to the associated processor which converts all "calls by value" into "calls by pointer" and builds a "pointer list" to be utilized by the FORTRAN routine. Lastly, returns from the FORTRAN routine are converted into value data types acceptable to APL according to the locally recorded list.

As an even more concrete instance of the method of this invention, where an APL application calls a FORTRAN routine, it should be appreciated that the APL arguments are typed as double-precision floating point numbers. It is well known that many FORTRAN routines expect single-precision floating point numbers.

The method of this invention builds and records a pointer list, converts and remits to the FORTRAN routine those APL arguments from "double" to "single" precision form, and reconverts the FORTRAN routine results from "single" to "double" precision form according to the list before passing control back to the APL application.

It is well appreciated that there exist two principal high-level language to machine code translation constructs. These are, respectively, compilers and interpreters. Interpreters are used to support interactive language systems such as APL. Interpreters include a symbol or name table of finite size in order to define labels, functions, and data for either local or global treatment within a workspace. In the method of this invention, if a name is declared such that it is to be used external to the workspace, then a predetermined syntax must be followed. This admittedly bears a superficial similarity to a pseudo-assembly level code operation EXTRN described in "Macro Assembler", published by Microsoft, 1st Edition, copyright December 1981, pp. 5-21 to 5-22. This pseudo-assembly level operation mandates that symbols used in a first assembly module have their attributes defined in another assembly module. In several of the high-level block structured languages, such as PL/1 and MODULA-2, there exist instances where names in one module are defined or executed in other modules. See, for instance, Wirth, "Programming in MODULA-2", 2nd Edition, Springer-Verlag Publishing Co., copyright 1982, pp. 80-81.

BRIEF DESCRIPTION OF THE DRAWING

FIG. 2 sets out the listings for a typical NAMES file according to the method of the invention.

FIG. 3 shows patterns of argument used in, respectively, an external FORTRAN language processor and an APL interactive processor.

FIG. 4 depicts the characterization of argument and result attributes of the external processor recorded by the auxiliary process in the NAMES file according to the invention.

FIG. 5 sets out additional argument patterns and their names table characterization.

FIG. 6 illustrates call by value and call by name.

DESCRIPTION OF THE PREFERRED EMBODIMENT AND INDUSTRIAL APPLICABILITY

Figure 1:
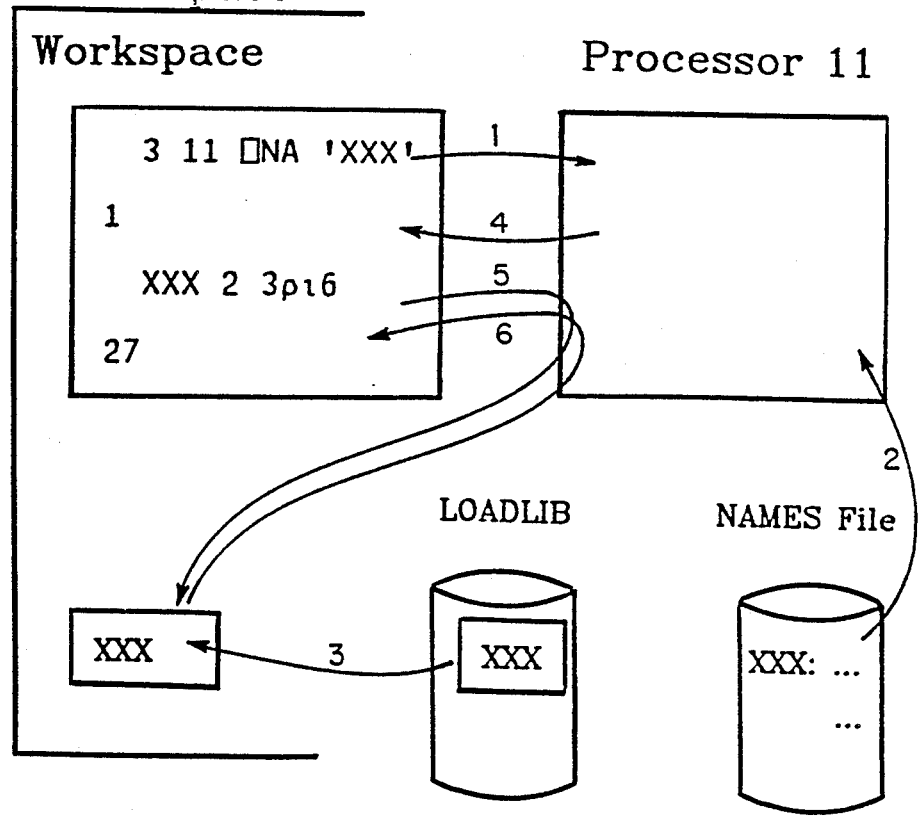
FIG. 1 is an overview depicting the relations among the auxiliary processor, the interactive language workspace, and the external process.

In an interpreter-based interactive language system, such as APL, based on a general array data structure, typing is strictly dynamic. A large class of primitive operators is built in and includes many which create, destroy, and modify arrays. Every APL primitive function returns a value. From these primitives, extremely powerful expressions may be constructed. As previously mentioned, the APL programs and applications operate in an environment called the APL workspace. A workspace contains all APL components associated with and necessary for the proper operation of an application. These components are called APL objects.

There are only three kinds of objects. These include arrays, which are structured collections of alphanumeric data; functions, which are programs that manipulate and perform computations on arrays; and operators, which process functions to create new functions for application to arrays. An APL object in a workspace has a name. This is assigned to the object when it is created and is used to reference the object by an application. Likewise, APL functions are invoked by using their names and expressions. APL-defined functions are programs defined as ordered sequences of array operations. Defined functions use other functions, both primitive and defined. In a similar sense, APL has primitive and defined operators. Defined operators, like defined functions, are constructed from ordered sequences of array operations.

External communication is established by variables which are shared between APL programs and other systems, subsystems, the APL language processor environment, or auxiliary processors.

External Functions and Name Associations

A name association facility permits APL applications to access external subroutines without having to terminate the APL language session. The name association facility provides a mechanism for informing the APL system to take special action when it encounters the name of a particular function in an APL expression. More particularly, this facility allows the system to associate with the function name in the APL workspace an external function coded, for example, in FORTRAN. After the association has been established, the external function may be invoked when the function name is encountered in any APL expression.

Overview

Referring now to FIG. 1, there is shown a schematic relation among the elements of the invention. To be usable from APL, a compiled external routine such as a FORTRAN or ASSEMBLER routine is link edited into a load library (LOADLIB). These routines must also be described in a NAMES file associated with a processor, designated arbitrarily as processor 11. Processor 11 then loads the requested routine and returns with a successful return code to the APL interpreter.

When the name of an external function is subsequently encountered in an APL expression, APL will check its arguments against the descriptive information that was provided in the NAMES file and convert them, if necessary and possible. Control will then be passed to processor 11, which in turn will call the external function. On completion of execution of the external function, processor 11 will pass results back to APL. These results will be converted to a valid APL internal format if necessary before execution of the APL application proceeds. As mentioned above, the external routine is loaded once when the name is declared external and associated with processor 11. The routine may then be executed repeatedly if desired. The routine is deleted when the external name is expunged by an APL application, when the workspace is replaced, or when the session is terminated.

Once a name has been declared external and associated with a processor, the association remains until the name is expunged. In particular, external names may be saved with a workspace, and when the workspace is reloaded, the names retain their association.

The name association system function □NA is the APL language construct used to associate the external subroutines with names in the APL applications. An example of such an expression is:

3 11 □ NA 'XXX'

The left argument to □ NA, the numeric list 3 11, indicates that an external object with name class 3 (i.e. function) is being associated using associated processor 11, the compiled code external function interface. The right argument to □NA, the character string 'XXX', is the name of the function to be associated. Note that invoking □NA gives a numeric result. The value 1 shown in the workspace in FIG. 1 on the line following the □NA indicates a successful association. A value 0 would indicate an unsuccessful association.

The NAMES File

Processor 11 accesses one or more NAMES files to locate the descriptive information for external names. The NAMES file contains tags and descriptive information of the form :TAG<arguments specific to the tag>.

Information

Related information is grouped together and distinguished with :NICK. tags. An example of NAMES file content is shown with reference to FIG. 2. In the NAMES file accessed by processor 11, the following descriptive information is typically maintained for each external function supported:

:NICK. the name of the external function;
:LOAD. the library in which the corresponding external routine resides;
:MEMB. the member name of the external routine in the load library;
:LINK. linkage convention used by the external routine; and
:RARG. argument patterns which describe the
:LARG. arguments expected by the external routines.

This defined information set is required for each external function. However, such a concordance is not limited and may include optional information such as function timestamp, alternate entry point, etc.

Processor 11 accesses its NAMES files and extracts the above-defined information set when a name is first associated with the processor, or when processor 11 is contacted by APL after a workspace containing external names is reloaded. Information from the NAMES file is used by processor 11 to both locate and load the desired routine, and build parameter lists for it each time it is called. A subset of the information from the NAMES file is passed back to the APL workspace when the name association occurs. In particular, APL receives the function timestamp if one is provided and, most particularly, the argument patterns.

Argument Patterns

Referring now to FIG. 3, there are shown argument patterns which the method of the invention, as implemented in the interactive APL language system, receives from processor 11 in order to validate and, if necessary, convert the actual arguments provided when the external function is called. The argument patterns in FIG. 3 describe the number of arguments expected by an external function, and the data type, rank, and shape of each argument. Variable ranks and shapes can be specified. The argument patterns also specify which, if any, of the arguments should be updated by the external routine or returned as a result.

Referring to the subroutine labeled FORTRAN in the upper portion of FIG. 3, three arguments are expected. These are:

A—a 1∅×1∅ matrix of real numbers,
B—a half-word integer scalar, and
C—a vector of four characters.

Referring again to FIG. 3, under the designation APL:, there is shown a set of APL statements which could be used to call this external routine. More particularly, statement A designates a 1∅×1∅ array for real numbers, statement B defines an integer, and statement C designates a 4-element character string. The □ NA is the name association function identifying the external routine CALC. Note that in APL terms, CALC is a monadic function which takes a 3-item nested right argument. Each item in the nested APL argument corresponds to an argument in the FORTRAN routine. This permits APL to call external routines which require more than two arguments.

At the bottom of FIG. 3, there is shown the counterpart NAMES file entry argument pattern for this external function which reflects the nested structure of the expected argument, i.e.

:RARG. (G∅ 1 3) (E4 2 1∅ 1∅) (I2 ∅) (C1 1 4).

This NAMES file entry specifies that the argument is a general array (type "G∅") with rank 1 and shape 3. The first item of the general array is REAL*8 (type "E8"), rank 2, shape 1∅×1∅. The second is a half-word integer (type "I2"), scalar (rank ∅). The third item is a character (type "C1"), vector (rank 1), of length 4. Formally, this argument pattern is a recursive structure, where each item of the argument is described with a character string of the form:

[x/ρ] [<|>] RT RL ρρ [ρ]

where
x/ρ is the number of elements in the item,
<or> indicates the item is returned or updated,
RT RL specify the representation type (data type) and length,
ρρ is the item rank, and
ρ is the item shape.

A definition of the code characterization of the arguments and results used and returned by the external function, in this case the FORTRAN subroutine CALC, is set out in FIG. 4. Additional characterization of argument patterns in the NAMES file is shown in FIG. 5.

Results and Updated Arguments

Routines in languages like FORTRAN or ASSEMBLER typically do not distinguish between input arguments and results. These processors are passed a list of pointers to the values that may represent input arguments, values to be updated, or preallocated space for results. In contrast, APL functions take arguments that are never updated and produce explicit results that were not previously passed as arguments to the function. For example, reference should be made to FIG. 6. APL requires that functions that update argument data in place be called with the names of the arguments, rather than their values. This is true whether the call is by value or the call is by name. The processor must support both approaches. Argument items to be updated in place are indicated with the symbol ">" preceding the representation type (RT) in the argument pattern placed in the names table. For example, a FORTRAN routine that expects two integer values as arguments, the second of which is to be updated in place, would be described by:

:RARG. (G∅1 2) (I4 1 3) (>I4 1 3).

As with APL functions, such routines must be called with the names of the arguments to be updated, rather than their values:

RESULT←3ρ∅
COMPUTE←(1 2 3) 'RESULT'.

APL, in this instance, would check to ensure that arguments specified with the symbol ">" in their pattern are names and not values. If names are not found when the function call occurs, an error will result.

Arguments that are updated by an external function can be made items of its explicit result by specifying the symbol "<" preceding the representation type in the argument pattern. These arguments need not be specified by name. Instead, APL makes a copy of the argument value provided, allows the external function to update that copy, and then uses the updated value as an item of the explicit results of the external function call. For example, a FORTRAN routine which takes a vector of integers as input and produces a vector of real numbers as a result might be described as:

:RARG. (G∅1 2) (I4 1 3) (<E8 1 3)

and later called in an APL expression, such as

OUTPUT←COMPUTE (ι3) (3ρ∅).

Note that the second argument, (3ρ∅), must be passed to the external function, since languages like FORTRAN require that space for results be preallocated by the caller.

We claim:

1. In an asynchronous multiprocessing environment, said environment having memory means for storing indicia of processes, and computing means for accessing said indicia and for executing processes represented by the accessed indicia,
   said processes communicating only by reading and writing of shared variables, invocation of one process by another using attendant information being denominated as a "call",
   a multiprocessing environment implemented method for managing a source process invoking a computation to be performed by an external process, said method also managing bidirectional conversion of arguments and result data into forms acceptable to both the source and external processes,
   comprising the steps of:
   (a) establishing a message interface between the source and external processes including designating and locally recording argument data types expected by the external process;
   (b) converting arguments to the data types expected by the external process and converting all calls by a value type from the source process into calls by a pointer type, and passing said converted calls via the interface to the external process; and
   (c) responsive to completion of external processing, converting result data into data types acceptable to the source process.

2. A method according to claim 1, wherein the step including designating and locally recording argument data types further includes the steps of forming a concordance including a name designating the external process, a location in memory where the external process resides, and coded attributes of the arguments and results expected by the external process.

3. A method according to claim 2, wherein the attributes include the data type, rank, and shape of each argument.

4. A method for executing an external process and for accessing external data from within an interactive language workspace (WS), any WS process referencing said external process or data being synchronized and locked until said external process is completed and data referenced,
   said method being implemented in a system having memory means for storing indicia of processes, and computing means for accessing said indicia and for executing processes represented by the accessed indicia,
   comprising the steps of:
   (a) invoking the WS and processes, and upon a name being declared external and associated with a specified external process, both calling said specified process and passing names thereto from within the WS;
   (b) upon an acceptance by said specified process, returning to said WS a name class and a description of those expected arguments associated with operations;
   (c) upon an external name being encountered during execution of an expression within the WS, coercing arguments of any associated names by the WS to correspond to any received argument descriptors;
   (d) calling the specified process and requesting execution of the name and passing any arguments by the WS, and completing the WS requested operations and returning updated arguments by the specified process to said WS; and
   (e) converting the updated arguments into data structures acceptable by the WS.

5. A method according to claim 4, wherein the interactive language workspace is of the APL language type and the external processes referenced being selectively from executable FORTRAN or ASSEMBLER language types.

* * * * *